United States Patent
Cecchi et al.

(10) Patent No.: US 10,410,131 B2
(45) Date of Patent: *Sep. 10, 2019

(54) REDUCING GRAPHICAL TEXT ANALYSIS USING PHYSIOLOGICAL PRIORS

(71) Applicant: International Business Machines Corporation, Armonk, NY (US)

(72) Inventors: Guillermo A. Cecchi, New York, NY (US); James R. Kozloski, New Fairfield, CT (US); Clifford A. Pickover, Yorktown Heights, NY (US); Irina Rish, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 684 days.

This patent is subject to a terminal disclaimer.

(21) Appl. No.: 14/669,203

(22) Filed: Mar. 26, 2015

(65) Prior Publication Data
US 2016/0283852 A1    Sep. 29, 2016

(51) Int. Cl.
*G06N 7/00* (2006.01)
*G06F 17/27* (2006.01)

(52) U.S. Cl.
CPC ......... *G06N 7/005* (2013.01); *G06F 17/2785* (2013.01)

(58) Field of Classification Search
CPC ... G06N 7/005; G06N 99/005; G06F 17/2785
See application file for complete search history.

(56) References Cited

U.S. PATENT DOCUMENTS 6,330,554 B1 * 12/2001 Altschuler ............ G06Q 30/02
706/21
8,478,048 B2    7/2013 Ding et al.
(Continued)

FOREIGN PATENT DOCUMENTS

CN    102376061 A    3/2012
CN    103702080 A    4/2014
(Continued)

OTHER PUBLICATIONS

Chuang, Ze Jin and CHung-Hsien Wu. "Emotion Recognition from Textual Input Using an Emptional Semantic Network" 2002 [Online] Downloaded Jul. 27, 2017 https://pdfs.semanticscholar.org/7153/4ae8cbald253bc5aeab8d06f5fea8ec819d0.pdf.*
(Continued)

*Primary Examiner* — Ben M Rifkin
(74) *Attorney, Agent, or Firm* — Cantor Colburn LLP; Rahan Uddin (57) ABSTRACT

Embodiments relate to facilitating a meeting. A method for reducing an amount of communications to analyze in order to determine a cognitive state of an entity is provided. The method determines a first likelihood of an entity to have a particular cognitive state based on a set of physiological measures of the entity. The method receives communications from the entity. The method generates a graph of communications of the entity. The method performs a graphical text analysis on the graph to determine a second likelihood of the entity to have the particular cognitive state. The method determines whether the entity has the particular cognitive state based on the first likelihood and the second likelihood.

9 Claims, 6 Drawing Sheets (56) References Cited

U.S. PATENT DOCUMENTS

| | | | |
|---|---|---|---|
| 8,655,441 B2 | 2/2014 | Fletcher et al. | |
| 2001/0047265 A1* | 11/2001 | Sepe, Jr. | G10L 15/22 704/275 |
| 2004/0210159 A1 | 10/2004 | Kibar | |
| 2009/0234718 A1* | 9/2009 | Green | G06Q 30/0203 705/7.32 |
| 2012/0083668 A1* | 4/2012 | Pradeep | A61B 5/04015 600/300 |
| 2013/0036080 A1* | 2/2013 | Kane-Esrig | G06F 19/3437 706/46 |
| 2014/0161421 A1 | 6/2014 | Shoemaker et al. | |

FOREIGN PATENT DOCUMENTS

| | | | |
|---|---|---|---|
| WO | 2003/000015 A1 | 1/2003 | |
| WO | 2008/019800 A1 | 2/2008 | |
| WO | 2009/117171 A1 | 9/2009 | |

OTHER PUBLICATIONS

Liu, Yisi et al "Real-time EEG-based Human Emotion Recognition and Visualization" 2010 [Online] Downloaded Jul. 27, 2017 http://ieeexplore.ieee.org/ielx5/5654666/5654996/05656346.pdf?tp=&arnumber=5656346&isnumber=5654996.*

Ramirez et al.; "Color Analysis of Facial Skin: Detection of Emotional State"; In Proceedings of the IEEE Conference on Computer Vision and Pattern Recognition Workshops; 2014; pp. 468-473.

Guillermo A. Cecchi, et al., "Reducing Graphical Text Analysis Using Physiological Priors," U.S. Appl. No. 14/742,861, filed Jun. 18, 2015.

List of IBM Patents or Patent Applications treated as related; Date File: Mar. 26, 2015, pp. 1-2.

* cited by examiner

REDUCING GRAPHICAL TEXT ANALYSIS USING PHYSIOLOGICAL PRIORS

BACKGROUND

The present disclosure relates generally to use of a graphical text analysis to determine a cognitive state of an entity, and more specifically, to reducing an amount of communications needed to perform a graphical text analysis in order to determine a cognitive state of an entity.

When communicating, for example during a conversation, the participants in the communication may go through different states of mind or cognitive states depending on the course of the communication. These cognitive states may include interests, current knowledge, goals, desires, emotional states (e.g., anger, frustration, irritation, happiness, satisfaction, stress, etc.), to name a few. These cognitive states may be revealed implicitly or explicitly through an analysis of the communications that the participants make.

SUMMARY

Embodiments include a computer program product, a method, and a system for reducing an amount of communications to analyze in order to determine a cognitive state of an entity. According to an embodiment of the present disclosure, a computer program product is provided. The computer program product comprises a computer readable storage medium having program instructions embodied therewith. The program instructions readable by a processing circuit cause the processing circuit to perform a method of reducing an amount of communications to analyze in order to determine a cognitive state of an entity. The method determines a first likelihood of an entity to have a particular cognitive state based on a set of physiological measures of the entity. The method receives communication from the entity. The method generates a graph of communications of the entity. The method performs a graphical text analysis on the graph to determine a second likelihood of the entity to have the particular cognitive state. The method determines whether the entity has the particular cognitive state based on the first likelihood and the second likelihood.

According to another embodiment of the present disclosure, a method for reducing an amount of communications to analyze in order to determine a cognitive state of an entity is provided. The method determines a first likelihood of an entity to have a particular cognitive state based on a set of physiological measures of the entity. The method receives communication from the entity. The method generates a graph of communications of the entity. The method performs a graphical text analysis on the graph to determine a second likelihood of the entity to have the particular cognitive state. The method determines whether the entity has the particular cognitive state based on the first likelihood and the second likelihood.

According to a further embodiment of the present disclosure, a computer system for reducing an amount of communications to analyze in order to determine a cognitive state of an entity is provided. The computer system comprises a memory having computer readable instructions and a processor configured to execute the computer readable instructions. The instructions comprise determining a first likelihood of an entity to have a particular cognitive state based on a set of physiological measures of the entity. The instructions further comprise receiving communications from the entity. The instructions further comprise generating a graph of communications of the entity. The instructions further comprise performing a graphical text analysis on the graph to determine a second likelihood of the entity to have the particular cognitive state. The instructions further comprise determining whether the entity has the particular cognitive state based on the first likelihood and the second likelihood.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of the disclosure provide systems and methods that perform a graphical text analysis on the communications that an entity (e.g., a person) makes during the communication, in order to estimate the cognitive state of the entity that may be developed or changed during the communication. In some embodiments, the systems and methods determine that the entity is in a particular cognitive state (or that the entity's cognitive state has changed to the particular cognitive state) when the graphical text analysis indicates that the likelihood of the entity to be in the particular cognitive state, given the communications the entity makes, exceeds a desired threshold likelihood. Usually, it takes a certain amount of communications to analyze before the likelihood of the entity to be in the particular cognitive state exceeds the desired threshold likelihood. That is, it takes some duration of time into the communication to collect a sufficient amount of communications needed for the likelihood to exceed the threshold. The term entity is used herein to refer to any existing or real thing, including but not limited to individual persons, groups, organizations or machines that execute artificial agents with natural language processing capabilities. It is understood that where certain physiological characteristics are ascribed to the entity, the term entity may not include machines.

In some embodiments, the systems and methods reduce the amount of communications needed (and thereby reducing the duration of time needed) by using a set of physiological measures of the entity to determine a likelihood of the entity to be in the particular cognitive state. Physiological measures refer to states of biological tissues. Biological tissues comprise cells of a wide variety, each interacting with their surroundings according to their type, by means of emitting and absorbing small quantities of energy and matter, such as heat, electromagnetic fields, particles, and fluids.

Because tissues comprise large numbers of cells, their aggregate emissions and absorptions can often be measured using inexpensive wearable measurement devices. Specifically, in some embodiments, the systems and methods determine a Bayesian prior probability based on the physiological measures and use the prior probability to shorten the amount of communications needed for the graphical text analysis to reach a conclusion.

Figure 1:
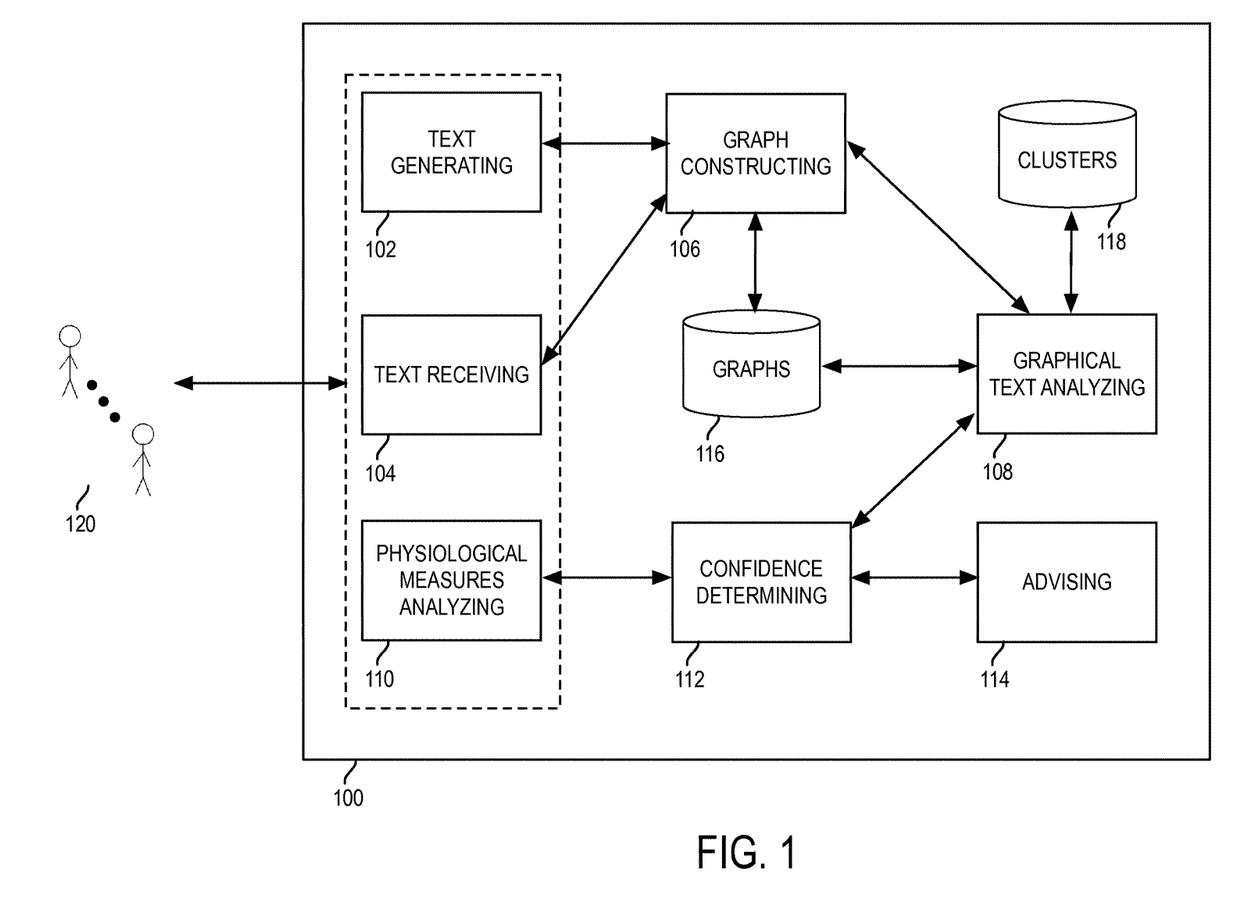
FIG. 1 depicts a system for reducing an amount of communications to analyze in order to determine a cognitive state of an entity according to an embodiment of the disclosure.

FIG. 1 illustrates a system 100 for reducing an amount of communications to analyze in order to determine a cognitive state of an entity. In some embodiments, the system 100 includes modules, sub-modules and data-stores such as a text generating module 102, a text receiving module 104, a graph constructing module 106, a graphical text analyzing module 108, a physiological measures analyzing module 110, a confidence determining module 112, an advising module 114, a graphs repository 116, and a clusters repository 118. FIG. 1 also illustrates participants 120.

The participants 120 are the participants of a communication (e.g., a conversation, text message exchange, video chat, email exchange, etc.) from which the system 100 receives the communications that the participants make. In some embodiments, the communications that the participants make include audible communications and textual communications. The audible communications that the participants 120 make include spoken words, utterances, sighs, exclamations, and any other sounds that may be converted to text. The textual communications are the communications generated by textual communication tools (not shown) that the participants 120 use to participate in the communication. For instance, the textual communications include text from side-chats, instant messaging, emails, tweets, TTY phone calls, faxes, social media content, etc.

In some embodiments, the participants 120 are entities that may include persons as well as machines that execute artificial agents with natural language processing capabilities. A communication may be carried out by two or more participants, at least one of which may be an artificial agent. More specifically, for example, the communication may be carried out by an artificial agent asking questions and a person caller that answers to the questions in a customer support environment.

The text generating module 102 transcribes the audible communications of the participants 120 into text. Specifically, the text generating module 102 converts the audio signals received from the participants 120 into text. The text generating module 102 may use one or more now known or later developed speech-to-text techniques for converting audio signals into text. The audio signals may be received from remote participants via a network such as the Internet (not shown) or from one or more microphones (not shown) used by local participants to participate in a communication.

The text receiving module 104 receives the textual communications of the text. The textual communications may be received from remote devices (i.e., stationary and mobile computers such as desktops, mobile computers, and smartphones, etc.) that the participants use to participate in the communication. These devices may convert the audio signals of the speeches into the text before sending the text to the system 100 or provide textual communication tools for the participants to use to participate in the communication.

The graph constructing module 106 receives the text of the participants' communications from the text generating module 102 and/or the text receiving module 104. The graph constructing module 106 then builds a graph from the received text for at least one of the participants 120. In some embodiments, the graph constructing module 106 builds one graph that includes communications of all participants. Alternatively or conjunctively, the graph constructing module 106 builds one graph for each participant that includes only the communications of the participant.

More specifically, in some embodiments, the graph constructing module 106 extracts syntactic features from the received text and converts the extracted features to vectors. These syntactic vectors may have binary components for the syntactic categories such as verb, noun, pronoun, adjective, lexical root, etc. For instance, a vector [0, 1, 0, 0 . . . ] represents a noun-word in some embodiments.

The graph constructing module 106 may also generate semantic vectors from the received text using one or more now known or later developed techniques (e.g., Latent Semantic Analysis and WordNet). The semantic content of each communication in the text may be represented by a vector, of which the components are determined by Singular Value Decomposition of word co-occurrence frequencies over a large database of documents.

Figure 2:
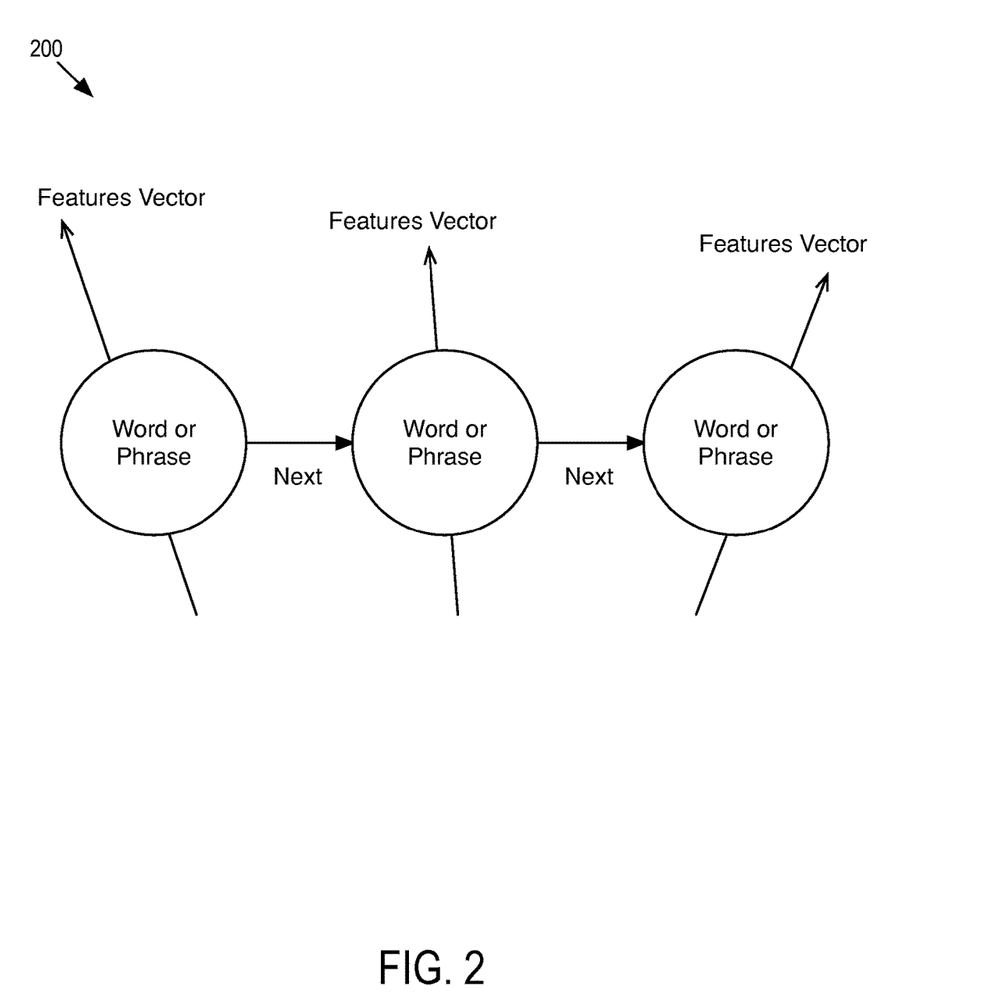
FIG. 2 depicts a graph of communications according to an embodiment of the disclosure.

A graph generated for a participant by the graph constructing module 106 may be in the form of: $G=\{N, E, \check{W}\}$, where the nodes N represent tokens (e.g., words or phrases), the edges E represent temporal precedence in the participant communications, and each node possesses a feature vector $\check{W}$ defined in some embodiments as a direct sum of the syntactic and semantic vectors and additional non-textual feature vector (e.g., a predetermined vector for the identity of the participant). That is, in some embodiments, the feature vector $\check{W}$ is defined by the equation: $\check{W}=\check{w}_{sym}\oplus \underline{w}_{sem}\oplus \check{w}_{ntxt}$, where $\check{W}$ is the feature vector, $\check{w}_{sym}$ is the syntactic vector, $\check{w}_{sem}$ is the semantic vector, and $\check{w}_{ntxt}$ is the non-textual features. An example graph 200 that may be generated by the graph constructing module 106 is shown in FIG. 2. As shown, the graph 200 is a directed graph that includes an ordered set of communications (e.g., words or phrases), each with a feature vector. Loops may form in this graph if the same communications are made more than once.

Referring back to FIG. 1, the graph constructing module 106 updates the graph as more text from the communication is received from the text generating module 102 and/or the text receiving module 104 as the communication continues. The graph constructing module 106 stores the generated graphs for the participants in the graphs repository 116.

The graphical text analyzing module 108 uses one or more machine learning tools and techniques now known or later developed in the art to extract topological features from the graph and makes inferences about the cognitive state of each participant. The graphical text analyzing module 108 performs a graphical text analysis on the graph for each meeting participant generated by the graph constructing module 106. As a specific example of a graphical text analysis, in some embodiments, the graphical text analyzing module 108 analyzes the graph G for the participant generated by the graph construction module 106 based on a variety of features. The variety of features include known graph-theoretical topological measures of the graph skeleton (i.e., a graph without features vectors: $G_{Sk}=\{N, E\}$) such as degree distribution, density of small-size motifs, clustering, centrality, etc. Similarly, additional values may be extracted by including the features vectors for each node of the graph. One such instance is the magnetization of the generalized Potts model (e.g., $H=\Sigma_n E_{nm}\check{W}_n T \check{W}_m$) such that temporal proximity (e.g., number of edges between two nodes) and feature similarity are taken into account. These features, which incorporate the syntactic, semantic and dynamical components of the communications, are then combined as a multi-dimensional features vector $\check{F}$ that represents a sample. This feature vector is finally used to train a standard classifier: $M=M(\check{F}_{train},C_{train})$, to discriminate the samples that belong to different conditions C, such that for each sample the classifier estimates its condition identity based on the extracted features: $C(\text{sample})=M(\check{F}_{sample})$.

In some embodiments, the graphical text analyzing module 108 compares the graph with the clusters of previously generated graphs stored in the clusters repository 118. More specifically, the feature vectors of previously generated graphs with known cognitive states are plotted in a multi-dimensional text feature space to form clusters in that space. The graphical text analyzing module 108 plots the feature vectors of the graph for the participant in the space, in order to determine whether the graph belongs to a cluster based on, e.g., distance between the plots of the graph and the plots of the clusters. In some embodiments, the graphical text analyzing module 108 also determines for each cluster a likelihood of the graph to belong to the cluster (i.e., the level of correlation between the graph and the cluster).

The confidence determining module 112 determines a confidence level indicating a likelihood of a participant to have a particular cognitive state. For example, the confidence determining module 112 may determine the level of stress that a participant has. In some embodiments, the confidence determining module 112 uses Bayesian inference to compute the conditional probability P(stress|evidence), where evidence includes any observations (e.g., communications) of the participant. P(stress|evidence) indicates the probability of stress given that evidence is true, meaning it indicates the probability or level of stress that the participant has, given that the participant made certain communications. If the probability is sufficiently high (i.e., above a threshold probability), the confidence determining module 112 determines that it is very likely the participant is under high stress.

The conditional probability P(stress|evidence), which is the probability of stress given that evidence is true, may be computed using the equation (1) according to Bayes rule:

$$P(\text{stress} \mid \text{evidence}) = \frac{P(\text{evidence} \mid \text{stress}) \times P(\text{stress})}{P(\text{evidence})} \quad (1)$$

where P(stress) and P(evidence) are the probabilities of stress and evidence, respectively, and P(evidence|stress) is the probability of evidence given that stress is true. In some embodiments, P(evidence|stress) is computed using a probabilistic model that relates stress (i.e., the condition) to evidence (i.e., the communications), and this model is learned in advance using, e.g., Naive Bayes, or Bayesian Network models. In the absence of any other evidence (i.e., using only the communications), P(stress) is a uniform distribution—there is a 50% probability that the participant has stress and a 50% probability that the participant does not have stress before the communication begins. P(stress), however, may not be a uniform distribution if evidence other than the communications of the participant is considered before the communication begins. For instance, P(stress) may start from a 70% probability that the participant is stressed. In such cases, the duration of time to collect the communications for P(stress|evidence) to exceed the threshold probability may be much shorter than when the communications alone are considered as evidence.

As previously noted herein, physiological measures refer to states of biological tissues. Biological tissues comprise cells of a wide variety, each interacting with their surroundings according to their type, by means of emitting and absorbing small quantities of energy and matter, such as heat, electromagnetic fields, particles, and fluids. Because tissues comprise large numbers of cells, their aggregate emissions and absorptions can often be measured using inexpensive wearable measurement devices. The physiological measures analyzing module 110 determines a likelihood of a participant to be in a particular cognitive state based on a set of physiological measures received from the participant. In some embodiments, this likelihood determined by the physiological measures analyzing module 110 is supplied to the confidence determining module 112, which uses this likelihood as a prior probability for the particular cognitive state. For instance, the physiological measures analyzing module 110 determines P(stress) based on physiological measures (i.e., evidence), and the confidence determining module 112 may use P(stress) to compute P(stress|evidence) according to equation (1) above. P(stress) determined by the physiological measures analyzing module 110 may suggest an elevated level of stress (e.g., 65%), and thus a smaller amount of evidence such as the communications of the participant would be required to achieve the same threshold probability for P(stress|evidence). Thus, the functioning of the system 100, which may be implemented in a computer system (e.g., computer system 12 described further below with reference to FIG. 4), may be improved.

In some embodiments, the set of physiological measures that the physiological measures analyzing module 110 includes non-invasive physiological measures such as a galvanic skin response of a participant, an EEG of the participant, a heart rate of the participant, a voice of the participant, a behavior analysis of video of the participant e.g., eye movements, facial communications, poses, body positions, gaits, etc.), and an observer assessment of the participant. The collection of such physiological measures may be approved in an opt-in fashion so that a participant gives permission to take these measurements. The measurements may also be gathered by means of a remote sensing device, such as an infrared or hyperspectral camera. The physiological measures analyzing module 110 employs one or more methods or systems now known or later developed in the art to determine a likelihood of a participant to be in a particular cognitive state based on a set of physiological measures received from the participant.

The advising module 114 generates notifications of the determined cognitive state and the confidence level to send to the participant, another participant, and/or a non-participant to the communication. In some embodiments, the advising module 114 displays the notification on a display (not shown) of the system 100. In some embodiments, the advising module 114 sends the notifications to the recipients via electronic communication means (e.g., emails, phone calls, text messages, etc.). By sending the notifications to the recipient(s), the advising module 114 cause the recipients to take actions that are deemed necessary. For instance, if the determined cognitive state indicates that the participant is highly stressed, the notification may be sent to a doctor who cares for the participant to take actions to lessen the stress of the participant.

Thus, it can be seen from the above that one or more embodiments of the present disclosure reduce the amount of communications needed (and thereby reducing the duration of time needed) by using a set of physiological measures of the entity to determine a likelihood of the entity to be in the particular cognitive state. More specifically, in FIG. 1, the most upstream operations that are reduced are text generating 102 and text receiving 104, which are time consuming and depend on a participant/entity generating speech or text in real time. Often participants may grow weary and fall silent. The present disclosure also reduces the operations graph constructing 106, graphs 116 and graphical text analyzing 108. These operations are functions of text generating 102 and text receiving 104, wherein the time to perform graph constructing 106, graphs 116 and graphical text analyzing 108 is equal to or greater than the time to perform text generating 102 and text receiving 104. As the time to perform text generating 102 and text receiving 104 goes to zero (0), the time to perform graph constructing 106, graphs 116 and graphical text analyzing 108 go to zero (0) as well.

Figure 3:
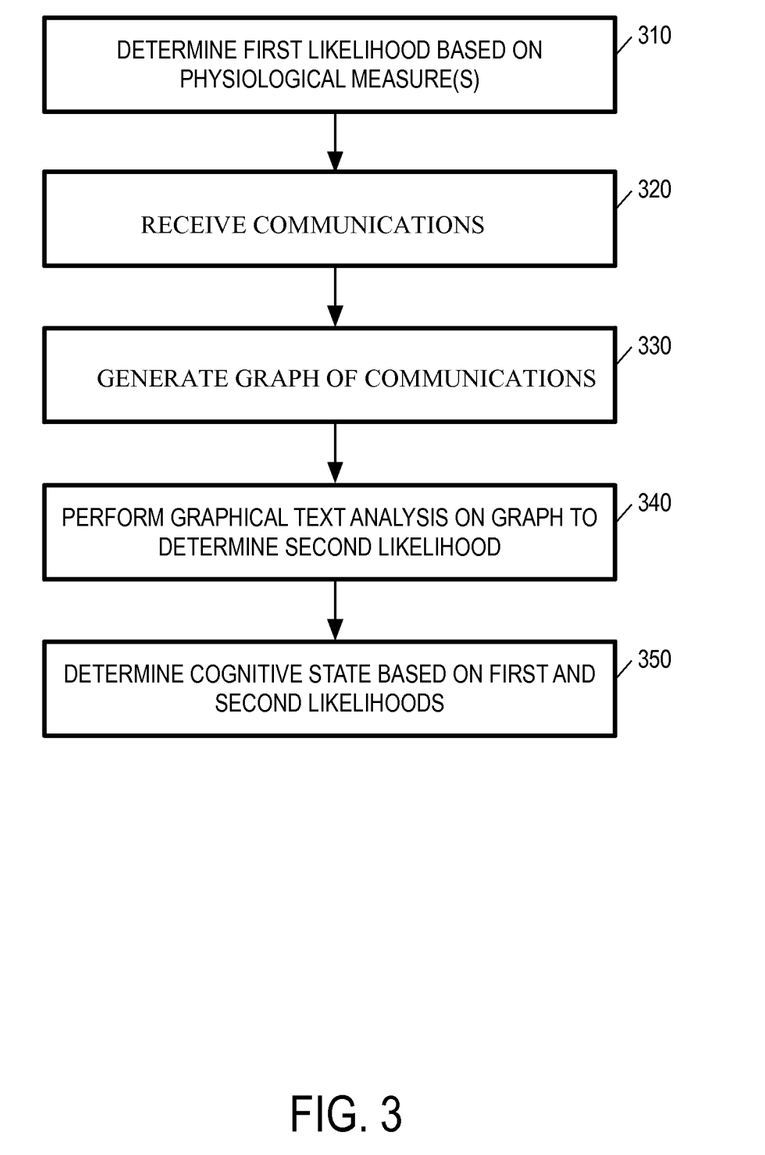
FIG. 3 depicts a process flow for reducing an amount of communications to analyze according to an embodiment of the disclosure.

FIG. 3 illustrates a process flow for reducing an amount of communications to analyze in order to determine a cognitive state of an entity. In some embodiments, the system 100 performs the process flow shown in FIG. 3. At block 310, the system 100 determining a first likelihood of an entity to have a particular cognitive state based on a set of physiological measures of the entity. In some embodiments, the physiological measures of the entity comprises at least one of a galvanic skin response of the entity, an EEG of the entity, a heart rate of the entity, a behavior analysis of video of the entity, and an observer assessment of the entity.

At block 320, the system 100 receives communications from the entity. In some embodiments, the communications include audible communications and textual communications of the entity. At block 330, the method generates a graph of communications of the entity. At block 340, the system 100 performs a graphical text analysis on the graph to determine a second likelihood of the entity to have the particular cognitive state.

At block 350, the system 100 determines whether the entity has the particular cognitive state based on the first likelihood and the second likelihood. Specifically, in some embodiments, the system 100 combines the first likelihood and the second likelihood using Bayes' rule to determine a combined likelihood and determines that the entity has the particular cognitive state if the combined likelihood exceeds a threshold likelihood. In some embodiments, the threshold likelihood is calibratable by, e.g., an administrator or user of the system 100. In response to determining that the entity has the particular cognitive state, the system 100 stops performing the graphical text analysis on the graph. In response to determining that a confidence level indicating that the entity has the particular cognitive state falls below a threshold confidence level, the system 100 starts performing the graphical text analysis on the graph. In response to determining that the entity has the particular cognitive state, the system 100 may trigger an action to help the entity to transition to another cognitive state from the particular cognitive state by means of, for example, additional information, such as text, visual simulation, electrical stimulation, sound stimulation, or other forms of alerting, including social.

It is understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
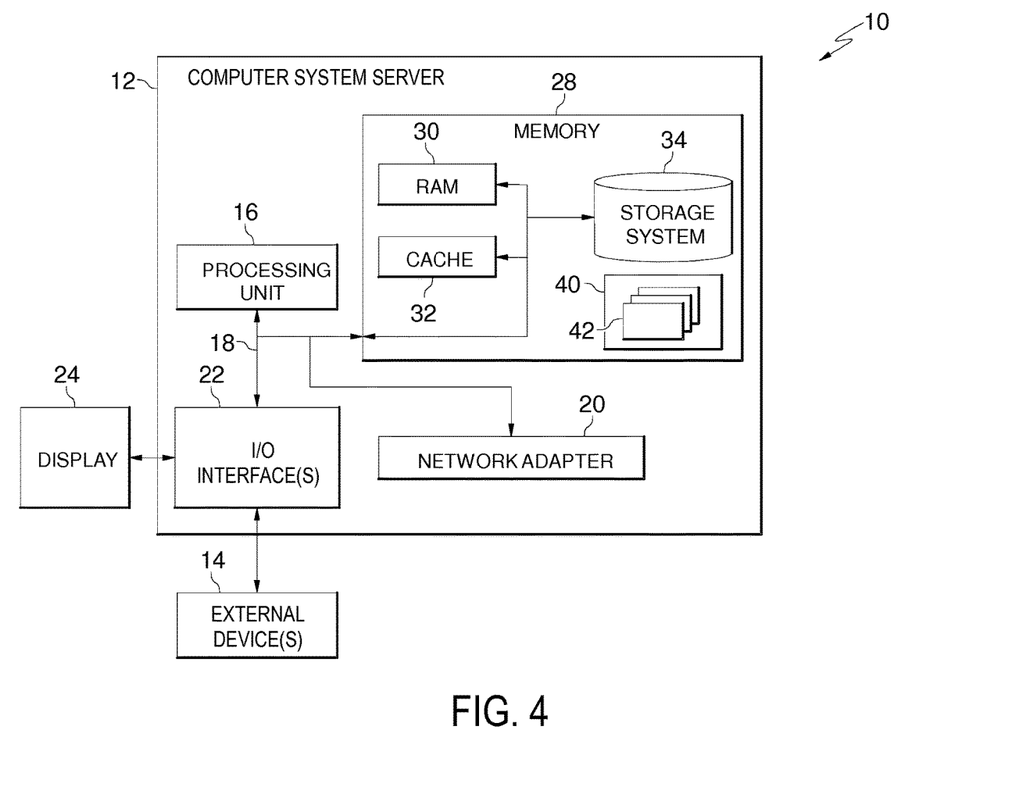
FIG. 4 depicts a cloud computing node according to an embodiment of the present disclosure.

Referring now to FIG. 4, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
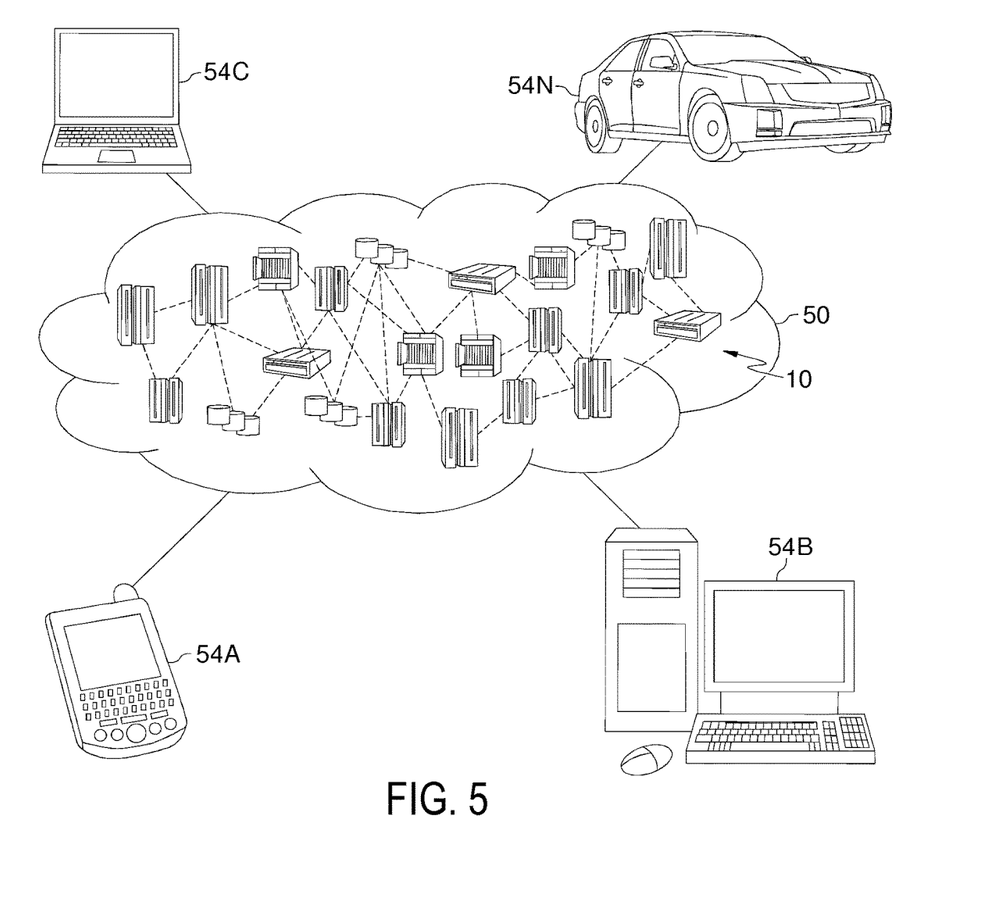
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
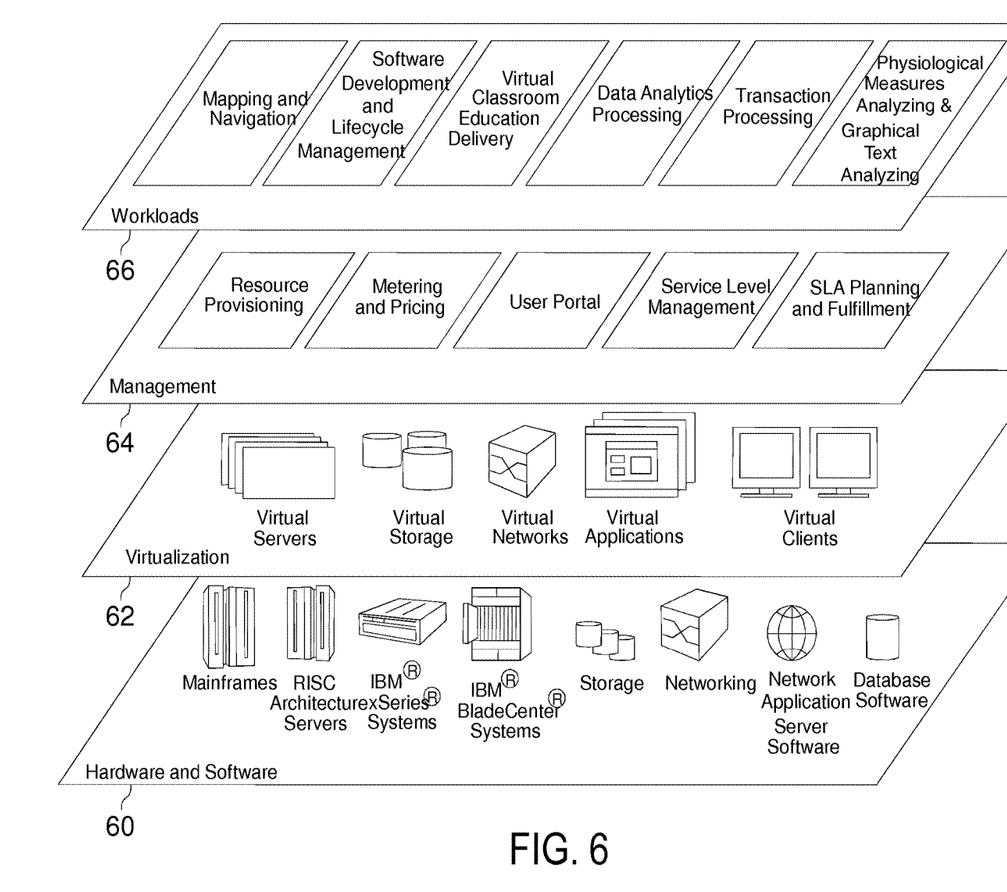
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and physiological measures analyzing and graphical text analyzing.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, comprising:
a computer readable storage medium having program instructions embodied therewith, the program instructions readable by a processing circuit to cause the processing circuit to perform a method of reducing an amount of communications to analyze in order to determine a cognitive state of an entity, the method comprising:
  receiving, by the processing circuit, a set of physiological measures of the entity that are taken by a wearable device;
  determining, by the processing circuit, a first likelihood of an entity to have a particular cognitive state based on the set of physiological measures of the entity that are received from the wearable device;
  receiving, by the processing circuit, electronic communications that are conducted by the entity, wherein the electronic communications includes audible communications comprising audio signals that are transmitted from the entity to at least one other entity;
  transcribing, by the processing circuit, the audible communications into text via an automated speech-to-text technique that converts the audio signals into the text;
  generating, by the processing circuit, a graph of the electronic communications of the entity, wherein generating the graph of the electronic communications of the entity includes:
    extracting, by the processing circuit, syntactic features from the text of the received electronic communications of the entity;
    converting, by the processing circuit, the extracted features into syntactic vectors;
    generating, by the processing circuit, semantic vectors from the text of the received electronic communications of the entity; and
    generating, by the processing circuit, the graph of the electronic communications of the entity based at least in part on the syntactic vectors and semantic vectors, wherein the generated graph of the electronic communications of the entity includes nodes representing tokens and edges representing temporal precedence in the electronic communications of the entity, wherein each node of the generated graph of the electronic communication of the entity comprises a feature vector that is generated based at least in part on a combination of a syntactic and semantic vector of the syntactic and semantic vectors;
  in response to determining that the first likelihood of the entity having the particular cognitive state falls below a threshold confidence level, starting performing, by the processing circuit, a graphical text analysis on the graph of the electronic communications of the entity to determine a second likelihood of the entity to have the particular cognitive state, wherein the graphical text analysis includes comparing the graph of the electronic communications of the entity with clusters of previously generated graphs stored in a clusters repository, wherein comparing the graph of the electronic communications of the entity with clusters of previously generated graphs stored in a clusters repository includes:

plotting, by the processing circuit, in a multi-dimensional text feature space, feature vectors of previously generated graphs having known cognitive states;

forming, by the processing circuit, clusters from the multi-dimensional text feature space;

plotting, by the processing circuit, the feature vectors of the generated graph of the electronic communications of the entity in the multi-dimensional text feature space; and     comparing, by the processing circuit, the plot of the feature vectors of the previously generated graphs having the known cognitive states with the plot of the feature vectors of the generated graph of the electronic communications of the entity;

determining, by the processing circuit, whether the entity has the particular cognitive state based on the first likelihood and the second likelihood; and in response to determining that the entity has the particular cognitive state:

stopping performing, by the processing circuit, the graphical text analysis on the graph before the graphical text analysis is completed;

generating a notification that indicates the particular cognitive state and a confidence level of the entity having the particular cognitive state; and     transmitting the notification to at least a third party, wherein the third party comprise an a entity that did not participate in the electronic communications.

2. The computer program product of claim 1, wherein the determining whether the entity has the particular cognitive state comprises:

combining the first likelihood and the second likelihood using Bayes' rule to determine a combined likelihood; and     determining that the entity has the particular cognitive state if the combined likelihood exceeds a threshold likelihood, wherein the confidence level of the entity having the particular cognitive state is based on the combined likelihood.

3. The computer program product of claim 2, wherein the threshold likelihood is calibratable.

4. The computer program product of claim 1, wherein the set of physiological measures of the entity comprises at least one of a galvanic skin response of the entity, an Electroencephalography (EEG) of the entity, a heart rate of the entity, a behavior analysis of video of the entity, and an observer assessment of the entity.

5. The computer program product of claim 1, wherein the method further comprises, in response to determining that the entity has the particular cognitive state, triggering an action to help the entity to transition to another cognitive state from the particular cognitive state.

6. A computer system for a method of reducing an amount of communications to analyze in order to determine a cognitive state of an entity, the system comprising:

a memory having computer readable instructions; and a processor configured to execute the computer readable instructions, the instructions comprising:

receiving, by the processing circuit, a set of physiological measures of the entity that are taken by a wearable device;

determining, by the processing circuit, a first likelihood of an entity to have a particular cognitive state based on the set of physiological measures of the entity that are received from the wearable device;

receiving, by the processing circuit, electronic communications that are conducted by the entity, wherein the electronic communications includes audible communications comprising audio signals that are transmitted from the entity to at least one other entity;

transcribing, by the processing circuit, the audible communications into text via an automated speech-to-text technique that converts the audio signals into the text;

generating, by the processing circuit, a graph of the electronic communications of the entity, wherein generating the graph of the electronic communications of the entity includes:

extracting, by the processing circuit, syntactic features from the text of the received electronic communications of the entity;

converting, by the processing circuit, the extracted features into syntactic vectors;

generating, by the processing circuit, semantic vectors from the text of the received electronic communications of the entity; and             generating, by the processing circuit, the graph of the electronic communications of the entity based at least in part on the syntactic vectors and semantic vectors, wherein the generated graph of the electronic communications of the entity includes nodes representing tokens and edges representing temporal precedence in the electronic communications of the entity, wherein each node of the generated graph of the electronic communication of the entity comprises a feature vector that is generated based at least in part on a combination of a syntactic and semantic vector of the syntactic and semantic vectors;

in response to determining that the first likelihood of the entity having the particular cognitive state falls below a threshold confidence level, starting performing, by the processing circuit, a graphical text analysis on the graph of the electronic communications of the entity to determine a second likelihood of the entity to have the particular cognitive state, wherein the graphical text analysis includes comparing the graph of the electronic communications of the entity with clusters of previously generated graphs stored in a clusters repository, wherein comparing the graph of the electronic communications of the entity with clusters of previously generated graphs stored in a clusters repository includes:

plotting, by the processing circuit, in a multi-dimensional text feature space, feature vectors of previously generated graphs having known cognitive states;

forming, by the processing circuit, clusters from the multi-dimensional text feature space;

plotting, by the processing circuit, the feature vectors of the generated graph of the electronic communications of the entity in the multi-dimensional text feature space; and     comparing, by the processing circuit, the plot of the feature vectors of the previously generated graphs having the known cognitive states with the plot of the feature vectors of the generated graph of the electronic communications of the entity;

determining, by the processing circuit, whether the entity has the particular cognitive state based on the first likelihood and the second likelihood; and in response to determining that the entity has the particular cognitive state:

stopping performing, by the processing circuit, the graphical text analysis on the graph before the graphical text analysis is completed;

generating a notification that indicates the particular cognitive state and a confidence level of the entity having the particular cognitive state; and transmitting the notification to at least a third party, wherein the third party comprise an a entity that did not participate in the electronic communications.

7. The system of claim 6, wherein the determining whether the entity has the particular cognitive state comprises:

combining the first likelihood and the second likelihood using Bayes' rule to determine a combined likelihood; and determining that the entity has the particular cognitive state if the combined likelihood exceeds a threshold likelihood, wherein the confidence level of the entity having the particular cognitive state is based on the combined likelihood.

8. The system of claim 6, wherein the set of physiological measures of the entity comprises at least one of a galvanic skin response of the entity, an Electroencephalography (EEG) of the entity, a heart rate of the entity, a behavior analysis of video of the entity, and an observer assessment of the entity.

9. The system of claim 6, wherein the instructions further comprise, in response to determining that the entity has the particular cognitive state, triggering an action to help the entity to transition to another cognitive state from the particular cognitive state.

* * * * *